United States Patent [19]
Kelli

[11] 3,744,172
[45] July 10, 1973

[54] FISH-ON-LINE SIGNALING DEVICE
[76] Inventor: John W. Kelli, 1560 Trellis Lane, Escondido, Calif. 92025
[22] Filed: Mar. 30, 1972
[21] Appl. No.: 239,540

[52] U.S. Cl. ................................................ 43/17
[51] Int. Cl. ...................... A01k 93/00, A01k 97/12
[58] Field of Search.................... 43/16, 17, 42.72, 43/43.1

[56] References Cited
UNITED STATES PATENTS

| | | | |
|---|---|---|---|
| 980,667 | 1/1911 | Owen | 43/17 |
| 2,181,458 | 11/1939 | La Gue | 43/17 X |
| 2,608,784 | 9/1952 | Lando | 43/17 |
| 2,700,238 | 1/1955 | Schrader | 43/17 |
| 2,749,648 | 6/1956 | Schneider | 43/17 |
| 3,053,003 | 9/1962 | Barnes et al. | 43/17 |

Primary Examiner—Russell R. Kinsey
Assistant Examiner—James H. Czerwonky
Attorney—Neil F. Martin et al.

[57] ABSTRACT

A device for indicating the presence of a fish on a fishing line by an audible signal. The device incorporates a resilient air bellows, that is compressed when a resilient shock cord is stretched beyond its normal extension, due to the increased tension produced by the fish on the line. The air expelled from the bellows passes through a whistle to produce the signal. The bellows includes a plurality of ribs to cause the bellows to resume its normal shape rapidly after the expulsion of air.

9 Claims, 5 Drawing Figures

PATENTED JUL 10 1973 3,744,172
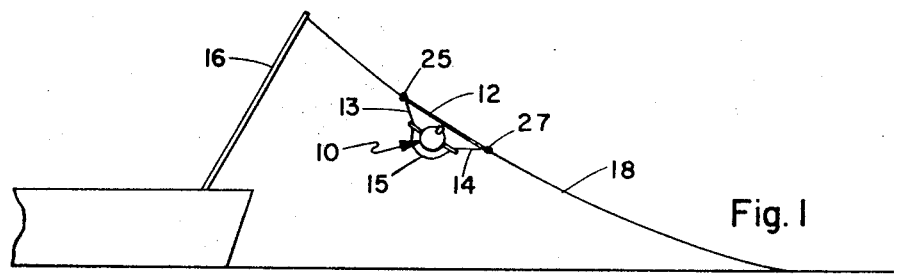
Fig. 1
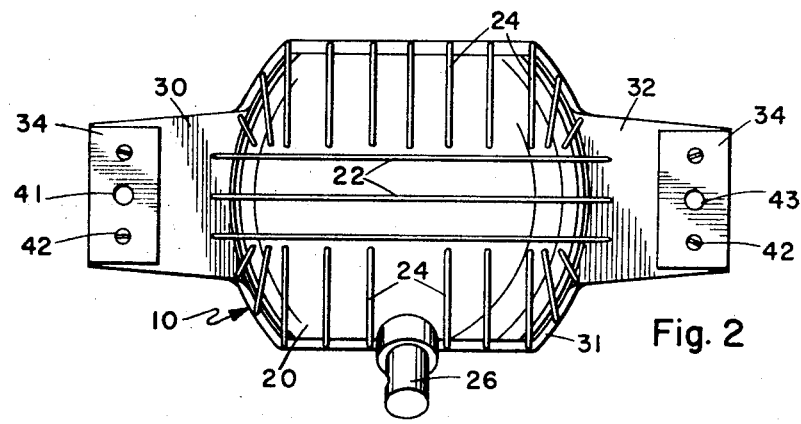
Fig. 2
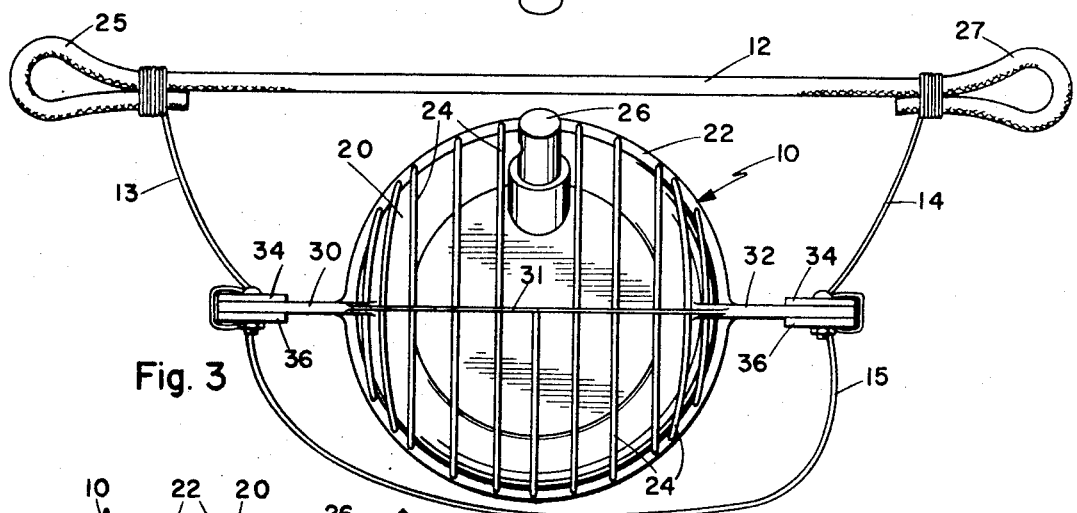
Fig. 3
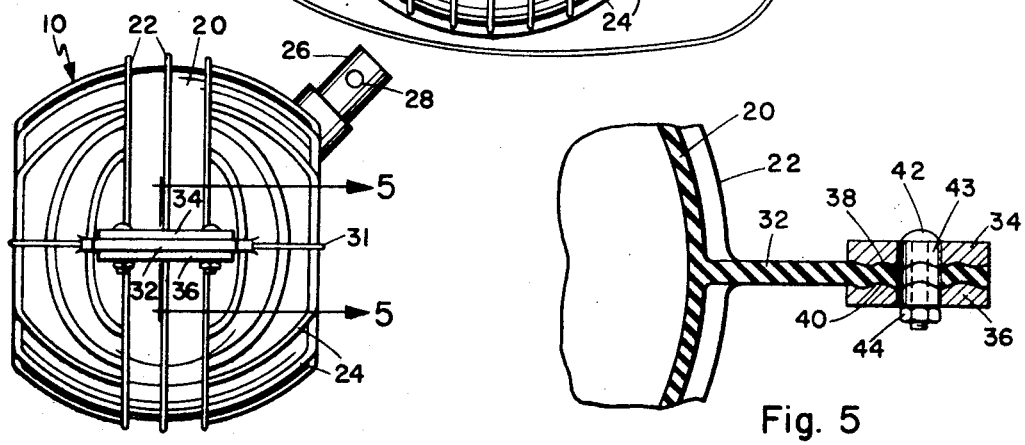
Fig. 4
Fig. 5

FISH-ON-LINE SIGNALING DEVICE

BACKGROUND OF THE INVENTION

In commercial fishing, both where the fish are caught by trolling lines and also where lines are used to alert the crew of a troller to the presence of a school of fish, it is common practice to have a number of lines overboard as the vessel moves slowly through the fishing grounds. In such operations, there are frequently long periods when no fish are caught. During these periods, the crew's attention is frequently diverted, so that when a fish is actually caught, it's presence may go undetected for a sufficiently long period that the location of the school will not be precisely known.

Thus, it would be desirable to have a signaling device that would indicate the presence of a fish on a fishing line by an audible signal. Existing signaling devices for this purpose are not practical for several reasons. Many of these devices do not produce a sufficiently loud audible sound to attract attention over the noise of motors or other ambient noise. Further, several existing signaling devices produce an explosive or similar non-repeating sound that is ineffective if it is not noticed at the first instance.

Finally there are signaling devices that incorporate an air bellows. These devices have not been connected in the fishing line and therefore must be supported, or mounted, from special supports and have the fish line routed nearby. Additionally, these devices must provide for the release of the line from the bellows, and therefore may not produce an audible signal, if the mechanism releases prematurely.

SUMMARY OF THE INVENTION

An exemplary embodiment of the invention incorporates a bellows of flexible material. The material has sufficient resiliency, so that after a whistling sound is produced by the expulsion of air, the bellows rapidly regains its original shape to be ready to produce successive audible signals. The bellows is compressed by extension from two attachment points and/or contact with a resilient means. The resilient means may be a shock cord, inserted in the fish line, to absorb the normal tension on the line and to extend an additional distance and compress the bellows when a fish is on the line.

The bellows is configured to have a plurality of attachment tabs. These tabs are arranged around the central portion of the bellows, and are for the purpose of securing the bellows to cordage. The cordage is utilized to connect the bellows between the ends of the resilient means. The tabs are secured to the cordage by tab clamps. These clamps comprise sustantially planar clamp elements and clamp the tabs under the influence of screw fasteners. The gripping force on the tab is enhanced by the use of a plurality of clamping ribs extending crosswise of the clamps. The ribs are spaced so that the opposed ribs on opposed clamp elements are in an alternating relationship to produce an increased gripping hold on the tab.

It is therefore an object of the invention to provide a new and improved fish-on-line signaling device.

It is another object of the invention to provide a new and improved fish-on-line signaling device that produces a loud audible signal in response to a fish being caught.

It is another object of the invention to provide a new and improved fish-on-line signaling device that rapidly returns to its original configuration after use to be ready for a second signal.

It is another object of the invention to provide a new and improved fish-on-line signaling device that is rugged and has a long operating life.

It is another object of the invention to provide a new and improved fish-on-line signaling device incorporating a bellows with improved attachment provisions.

It is another object of the invention to provide a new and improved fish-on-line signaling device with a bellows designed for maximum efficiency in manufacture.

It is another object of the invention to provide a new and improved fish-on-line signaling device that incorporates a resilient element to absorb the normal tension load.

Other objects and many attendant advantages of the invention will become more apparent upon a reading of the following detailed description together with the drawings in which like reference numerals refer to like parts throughout and in which:

FIG. 1 is a diagrammatic view of the signaling device installed in a fishing rig.

FIG. 2 is a top plan view of the signal producing unit.

FIG. 3 is a front elevation view of the unit with the attachment means added.

FIG. 4 is an end elevation view of the unit.

FIG. 5 is an enlarged sectional view taken on line 5—5 of FIG. 4.

Referring now to the drawing, there is illustrated a bellows 10 that is secured between opposite ends of a resilient means 12. The resilient means illustrated is a shock cord, and may be selected to accommodate variations in the normal running tension experienced on the line, depending on the type of jig being trolled, for example. The shock cord may be doubled over to create loops 25 and 27 and thereby may be conveniently secured to a swivel or other device for facilitating the attachment and removal of the signaling device in the line. The shock cord would be selected so as to absorb this normal running tension without excessive extension, but to be sufficiently extendable that the additional load created by a fish on the line 18, would extend the shock cord a sufficient distance to compress the bellows either by the bellows being extended by the attachment cords 13 and 14, by compression of the bellows against shock cord 12, or by a combination of the two effects. The compression of the bellows has the effect of expelling air through the hole 28 in whistle 26, thereby producing the audible signal that alerts the crew to the presence of the fish.

The bellows is designed to facilitate its manufacture in a mold, and for this reason it has a body 20 of rounded barrel shaped configuration, to facilitate release from the molds. The mold line 31 lies in the same plane as the attachment tabs 30 and 32, which extend from opposite sides of body 20 again facilitating the molding process.

It has been determined that latex rubber, such as B. F. Goodrich No. 269 is well suited to the purposes of the invention. This latex may be color impregnated to identify the device, and sets up at temperatures below 200° F. so that relatively unsophisticated manufacturing processes may be utilized.

The exterior configuration of the bellows includes a plurality of ribs 22 running around the circumference of the body 20, and a plurality of ribs 24 generally around the ends of the body. These ribs are for purposes of developing sufficient overall strength in the bellows to make it long wearing, and also for the purpose of causing the bellows to rapidly draw in air, and resume its original configuration after it has been compressed.

Referring now to FIG. 5, the configuration of the attachment tabs and tab clamps is illustrated. The tab clamps comprise an upper clamp 34 and lower clamp 36 secured by a plurality of screw fasteners 42 and nuts 44. The gripping effect of the clamp is enhanced by opposed clamping ribs 38 and 40. The ribs are staggered on the opposed clamps so as to produce a maximum gripping effect, without stressing the rubber excessively. The clamp also includes attachment holes 41 and 43 through which the cordage may be passed and secured.

The manner in which the bellows is secured to the shock cord is illustrated in FIG. 3. The bellows 10 is secured by cordage 13 and 14 between opposite ends of the shock cord 12. The cordage may be of any suitable type, such as Nylon, that is relatively unelastic. In this manner, the elastic effect is concentrated in the bellows and shock cord. A third piece of cordage 15 is utilized as a bellows bypass means, or safety line, so that excessive force on the fish line will not damage the bellows.

OPERATION

In use, the signaling device of the invention is secured to a fishing rig 16, as in FIG. 1, by attaching opposite ends of the resilient means 12 to spaced portions of the fish line 18. The selection of the particular length of shock cord to be utilized with the fish rig in question, will be dependent on the amount of normal tension that would be expected from the rig. The chock cord 12, will be selected to resist excessive extension under that normal tension but to significantly extend under the shock of additional tension created by the presence of a fish on the line.

After installation, the fishing rig is utilized in the normal manner, for example, it would be utilized for trolling a jig or other bait through the fishing grounds until a strike occured. When a strike occurs, the additional tension on the line extends the shock cord 12 sufficiently to compress the bellows 10. This compression expells a relatively large quantity of air through the opening 28 in whistle 26 and thereby creates a loud audible signal, to alert the crew to the presence of the fish. This early notice of the fish's presence, allows the vessel to be quickly turned around and more precisely locate the school.

Having described my invention, I now claim.

1. A device for producing an audible signal in response to the presence of a fish on a fishing line comprising, resilient load absorbing means for carrying the normal tension on a line, resilient bellows means secured between two spaced points on said resilient absorbing means for expelling a quantity of air in response to above normal extension of said resilient means, and signaling means mounted on said bellows means for producing an audible signal from the expulsion of air from said bellows means.

2. A device according to claim 1 wherein, said resilient means comprises an elongated resilient element, and said bellows is secured by relatively unelastic cordage to opposite ends of said resilient element.

3. A device according to claim 1 wherein, said bellows means comprises a rounded substantially barrel shaped bellows of elastic material.

4. A device according to claim 3 wherein, said bellows is made of latex rubber.

5. A device according to claim 3 wherein, said bellows has a plurality of raised ribs on its outer surface extending in at least two general directions.

6. A device according to claim 5 wherein, said bellows has a plurality of attachment tabs, and said bellows being secured between said spaced points on said resilient means by relatively unelastic cordage secured to said tabs.

7. A device according to claim 6 wherein, said cordage is secured to said tabs by opposed tab clamps, and said tab clamps comprising substantially planar elements with a plurality of crosswise raised clamping ribs.

8. A device according to claim 7 wherein, said clamping ribs on the first of said opposed elements being staggered with respect to said ribs on said second of said opposed elements.

9. A device according to claim 6 including, bellows bypass means for limiting the extension of said bellows comprising a length of relatively unelastic cordage connected between said attachment means.

* * * * *